(12) United States Patent
Yang et al.

(10) Patent No.: US 6,705,209 B2
(45) Date of Patent: Mar. 16, 2004

(54) PRESSURE COOKER (75) Inventors: Bing Yang, JiNan (CN); Jingran Fu, RuiAn (CN); Shiliang Llang, NanHai (CN)

(73) Assignee: Wen Wei Jian, Nanhai (CN)

( * ) Notice: Subject to any disclaimer, the term of this patent is extended or adjusted under 35 U.S.C. 154(b) by 0 days.

(21) Appl. No.: 10/069,235

(22) PCT Filed: Apr. 4, 2001

(86) PCT No.: PCT/IL01/00314
§ 371 (c)(1),
(2), (4) Date: Feb. 22, 2002

(87) PCT Pub. No.: WO01/76428
PCT Pub. Date: Oct. 18, 2001

(65) Prior Publication Data
US 2003/0010216 A1 Jan. 16, 2003

(30) Foreign Application Priority Data

Apr. 7, 2000 (CN) .......................................... 00227790 U
Apr. 7, 2000 (CN) .......................................... 00227792 U
Nov. 30, 2000 (CN) .......................................... 00240315 U (51) Int. Cl.$^7$ ................................................. A23L 1/00
(52) U.S. Cl. ........................... 99/337; 99/403; 219/440; 220/316

(58) Field of Search .................. 99/337, 403; 219/440, 219/438, 437; 220/316, 912, 315, 573.1, 318

(56) References Cited

U.S. PATENT DOCUMENTS

| | | | | |
|---|---|---|---|---|
| 4,620,643 A | * | 11/1986 | Sebillotte | 220/316 |
| 4,717,041 A | * | 1/1988 | Elexpuru | 220/316 |
| 5,135,121 A | * | 8/1992 | Javier | 220/316 X |
| 5,317,959 A | * | 6/1994 | Beluzzi | 99/337 |
| 5,768,976 A | * | 6/1998 | Suk | 99/337 |

* cited by examiner

Primary Examiner—Reginald L. Alexander
(74) Attorney, Agent, or Firm—G. E. Ehrlich (1995) Ltd.

(57) ABSTRACT

A pressure cooker includes a cooking pot (22) and a lid (23) removably attachable thereto by interlocking radially-extending circumferentially-spaced locking flanges on the cooking pot and lid. The lid and cooking pot further include handles to facilitate application of the lid to the cooking pot, and safety interlocks which vent the interior of the cooking pot to the atmosphere at all times except when the lid is securely locked to the cooking pot, and also prevent opening the lid when the interior of the cooking pot is pressurized. The lid further includes a manual pushbutton (73) to produce a rapid-release of the pressure within the cooking pot when the lid is to be removed.

20 Claims, 9 Drawing Sheets

PRESSURE COOKER

FIELD AND BACKGROUND OF THE INVENTION

The present invention relates to pressure cookers, and particularly to those which include cooking pots using steam under super-atmospheric pressure and at relatively high temperature to cook food quickly.

Because of the super-atmospheric pressure and relatively high temperature used by pressure cookers for cooking food quickly, there is a danger of being scalded by high-temperature steam if the pressure cooker is not properly used. Many pressure cooker constructions have been developed to reduce these dangers, but the known pressure cookers are generally complicated in construction, inconvenient to operate, and/or not completely safe in use.

OBJECTS AND BRIEF SUMMARY OF THE INVENTION

An object of the present invention is to provide a pressure cooker having advantages in one or more of the above respects.

According to one aspect of the invention, there is provided a pressure cooker, comprising: a cooking pot having an open end through which food articles are introduced for cooking, and removed after cooking; and a lid removably attachable over the open end of the cooking pot and securely lockable thereto to enable cooking at high pressure; the cooking pot being formed with a plurality of circumferentially-spaced locking flanges fixed to, and extending radially inwardly around it's the open end of the cooking pot; and the lid being formed with a plurality of circumferentially-spaced locking flanges extending radially outwardly around its outer periphery located to enable the lid: (a) to be applied over the open end of the cooking pot by passing the lid flanges through the spaces between the cooking pot flanges; and (b) to be rotated to either a locking position wherein the lid flanges underlie the cooking pot flanges to securely lock the lid to the cooking pot, or to an unlocking position wherein the lid flanges are in the spaces between the cooking pot flanges to enable detachment of the lid from the cooking pot.

According to another aspect of the invention there is provided a pressure cooker, comprising: a cooking pot having an open end through which food articles are introduced for cooking, and removed after cooking; and a lid removably attachable over the open end of the cooking pot and securely lockable thereto to enable cooking at high pressure; the lid including a gripping handle fixed thereto along its outer periphery; the cooking pot including at least one gripping handle fixed thereto at its open end and located to underlie the lid handle, and to be locked thereto, in the locking position of the lid; the lid further including: a venting valve movable to an open position to vent the interior of the cooking pot to the atmosphere, or to a closed position to permit the pressure in the cooking pot to rise to a super-atmospheric pressure; and a safety interlock within the gripping handle of the lid permitting rotation of the lid from one of its positions to its other position only when the valve is in its open position, and permitting movement of the valve from its open position to its closed position only when the lid is in its locking position with respect to the cooking pot; the lid being fixed to its gripping handle by a pair of fastener pins; the safety interlock including a control member movable from a first position when the two gripping handles are aligned, to a second position when the two gripping handles are not aligned;

said control member being formed with a pair of elongated slots receiving said fastener pins and guiding the movement of said control member.

According to a further aspect of the invention, there is provided a pressure cooker comprising: a cooking pot having an open end through which the food articles are introduced for cooking, and removed after cooking; and a lid rotably mounted over the open end of the cooking pot and securely lockable thereto to enable cooking at high pressure; the lid including a gripping handle fixed to the lid at one side of its outer periphery, and an auxiliary handle fixed to the lid at the opposite side of its outer periphery; the cooking pot including two gripping handles fixed to opposite sides of the open end of the cooking pot, such as to enable a user to grasp by two hands one handle of the lid and one handle of the cooking pot and to rotate the lid with respect to the cooking pot to the locking and unlocking positions of the lid.

As will be described more particularly below, a pressure cooker constructed in accordance with some or all of the foregoing features provides a number of important advantages. Thus, it enables the lid to be conveniently attached to and detached from the cooking pot. In addition, it provides a number of safety interlocks preventing misoperation of the pressure cooker thereby making the pressure cooker safer to use. Further, it requires relatively few, simple pats, which can be produced and assembled in volume and at relatively low cost.

Further features and advantages of the invention will be apparent from the description below.

BRIEF DESCRIPTION OF THE DRAWINGS

The invention is herein described, by way of example only, with reference to the accompanying drawings, wherein.

Figure 1:
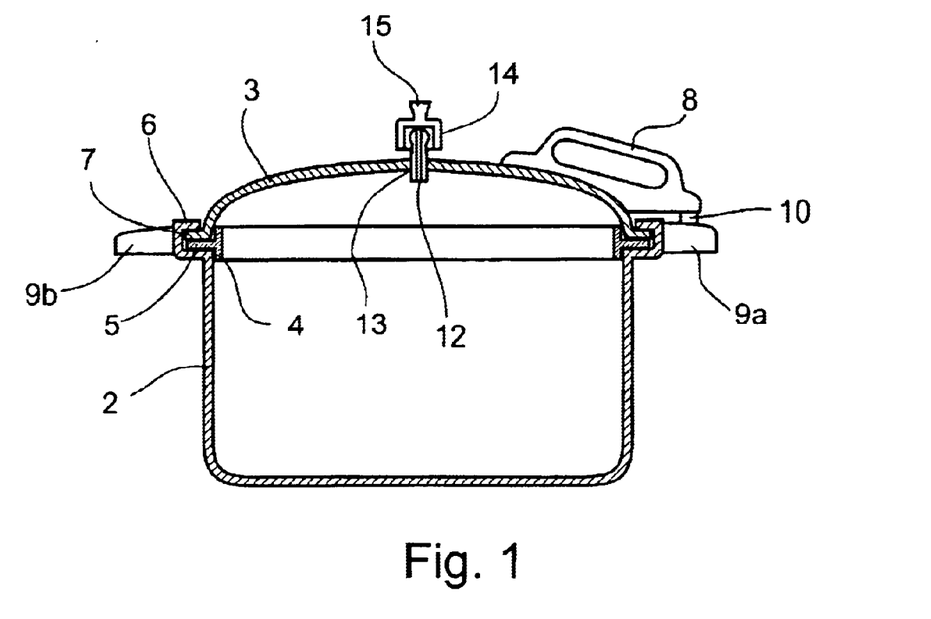
FIG. 1 is a longitudinal sectional view illustrating one form of pressure cooker constructed in accordance with the present invention.
Figure 2:
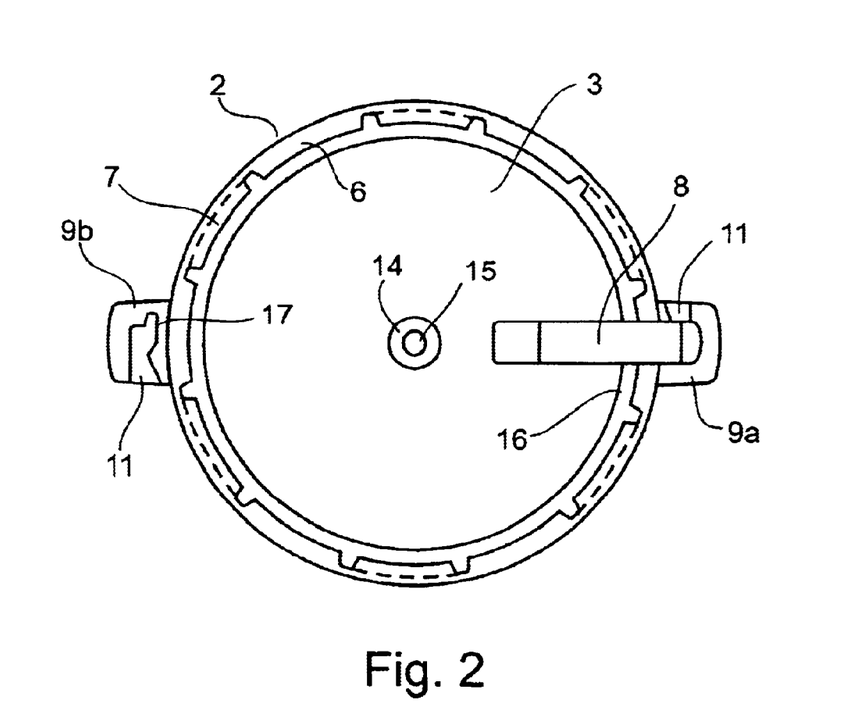
FIG. 2 is a top plan view of the pressure cooker of FIG. 1.
Figure 3:
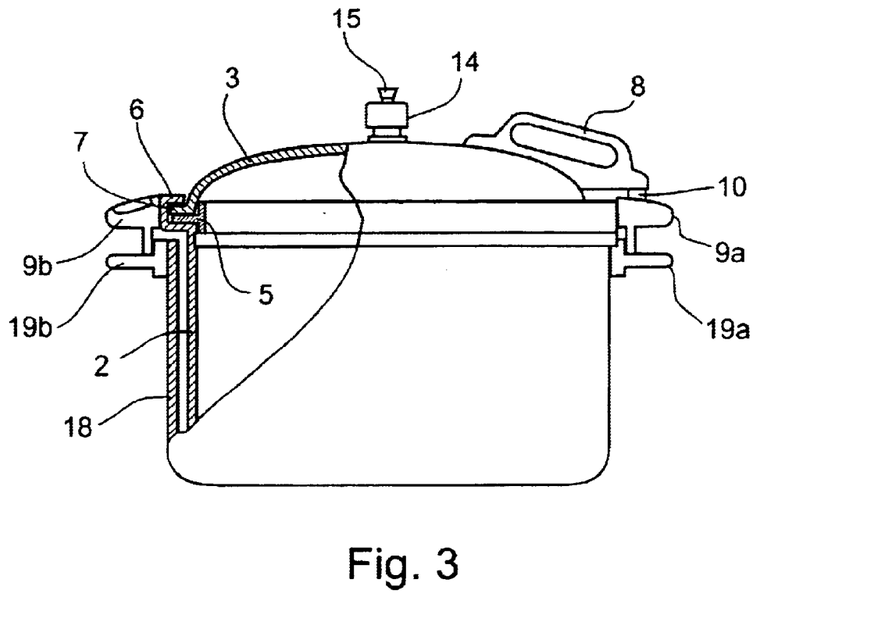
FIG. 3 is a side elevational view, partly in section, illustrating the pressure cooker of FIG. 1 included within an outer housing for steam-heating the food within the cooking pot of the pressure cooker.

DESCRIPTION OF THE EMBODIMENT OF FIGS. 1–3

FIGS. 1–3 illustrate a relatively simplified form of pressure cooker constructed in accordance with the present invention. The illustrated pressure cooker includes a cooking pot 2 having an open end through which the food articles are introduced for cooking and removed after cooking, and a lid 3 removable attachable over the open end of the cooking pot and securely lockable thereto to enable cooking at a high pressure. The open end of the cooking pot 2 is formed with an annular seat 4. An annular gasket 5 is seated on seat 4 and seals the space between the cooking pot 2 and the lid 3 when the lid is securely locked to the cooking pot.

For securely locking lid 3 to the cooking pot 2, the cooking pot is formed with a plurality of radially-extending circumferentially-spaced locking projections or flanges 6 fixed to, and extending around, its open end overlying its annular seat 4; and similarly the lid 3 is formed with a plurality of radially-extending circumferentially-spaced locking projections or flanges 7 fixed to, and extending around, its outer periphery. Flanges 6 of the cooking pot extend radially inwardly, and flanges 7 of the lid extend radially outwardly. Flanges 7 of the lid 3 are located, with respect to flanges 6 of the cooking pot 2, such as to enable the lid: (a) to be applied over the open end of the cooking pot by passing the lid flanges 7 through the spaces between the cooking pot flanges 6; and (b) to be rotated, from an unlocking position wherein the lid flanges are in the spaces between the cooking pot flanges, to a locking position wherein the lid flanges are aligned with and underlie the cooking pot flanges. The latter position, namely the locking position of the lid 3, is shown in FIG. 2.

In the pressure cooker illustrated in FIGS. 1 and 2, the lid 3 has a single handle 8 fixed to the lid at its outer periphery; and the cooking pot 2 has two handles 9a, 9b fixed to the open end of the cooking pot S at its diametrically opposite sides. The lid handle 8 includes a locking member 10 projecting downwardly into a shaped recess 11 (FIG. 2) formed in the upper surface of the underlying cooking pot handles 9a for securely locking the lid 3 to the cooking pot 2, as will be described more particularly below with respect to the pressure cooker illustrated in FIGS. 4–22. FIG. 2 shows both handles 9a, 9b formed with the shaped recess 11 to simplify production and inventory costs.

The pressure cooker illustrated in FIGS. 1 and 2 further includes a controllable venting passageway through the lid 3 for controlling the pressure within the cooking pot during a cooking operation. As shown in FIG. 1, this venting passageway is defined by an axial bore 12 through a stem 13 fixed to lid 3 and closed at its outer end by a weight 14 formed at its upper end with a finger piece 15.

It will be seen that, in the pressure cooker illustrated in FIGS. 1 and 2, the lid 3 may be attached to the cooking pot 2 by grasping lid handle 8; inserting the circumferentially-spaced flanges 7 of the lid between the circumferentially-spaced flanges 6 of the cooking pot, while pressing against the annular gasket 5; inserting the locking member 11 of the lid handle 8 into the shaped recess 11 of the underlying cooking pot handle 9a; and, while grasping handle 8 with one hand and either handle 9a or handle 9b with the other hand, rotating the lid 3 to move the lid flanges 7 under the cooking pot flanges 6 to the locking position illustrated in FIG. 2. It will also be seen that the lid 3 may be unlocked and detached from the cooking pot 2 by rotating the lid in the opposite direction, to bring the lid flanges 7 into the spaces between the cooking pot flanges 6.

Since the cooking pot flanges 6 extend inwardly, and the lid flanges 7 extend outwardly, both sets of flanges can be readily seen when attaching the lid 3 to the cooking pots 2, and also while detaching the lid from the cooking pot. Such an arrangement thus facilitates the attachment and detachment of the lid. To further facilitate the attachment of the lid, it may be provided with a reference mark, as shown at 16 in FIG. 2, to be aligned with another reference mark in the underlying cooking pot handle (corresponding to reference mark 17 in handle 9b in FIG. 2) in order to conveniently locate the lid flanges 7 in the spaces between the cooking pot flanges 6 when applying the lid to the cooking pot.

The cooking pot 2 is generally used with an outer housing, shown at 18 in FIG. 3, for cooking the food articles within the cooking pot. Outer housing 18 is also provided with a pair diametrically-opposed gripping handles 19a, 19b, to enable convenient handling of the outer housing alone, or with the cooking pot. A heating liquid, usually water, is introduced into the outer housing 16 before the cooking pot 2 is applied thereto in the manner shown in FIG. 3, and is heated by an internal electrical heater (not shown), or by an external heating source (e.g., a conventional stove), to heat the cooking pot 2 and the food articles within it.

When the illustrated pressure cooker is used for heating the food articles within the cooking pot 2, weight 14 normally covers the venting passageway 12 in the vertical stem 13 through the lid 3. Weight 14 will thus permit the pressure within the cooking pot to rise above atmospheric pressure and thereby to produce a higher temperature and pressure within the cooking pot for faster heating of the food articles therein. The pressure within the cooking pot is therefore determined by weight 14; that is, the heavier the weight, the higher will be the pressure within the cooking pot before the weight rises to release the excess pressure.

Fingerpiece 15 of weight 14 enables the user to manually lift the weight, and thereby to effect a rapid release of the pressure within the cooking pot, whenever desired e.g., before the lid 3 is to be detached from the cooking pot.

Cooking pot 2, its lid 3, and the outer housing 18 are made of a suitable metal for heat and corrosion resistance; the handles 8, 9a, 9b, 19a and 19b are made of a suitable plastic to enable hand gripping; and the annular gasket 5 is made of a suitable elastomeric material to produce a tight seal between the cooking pot and the lid when attached thereto.

DESCRIPTION OF THE EMBODIMENT OF FIGS. 4–22

Overall Construction

The pressure cooker illustrated in FIGS. 4–22 is constructed similarly to that illustrated in FIGS. 1–3, except that it includes a number of features to better assure proper operation of the pressure cooker, and particularly to prevent accidental scalding of the user by the high pressure steam developed within the pressure cooker.

Figure 4:
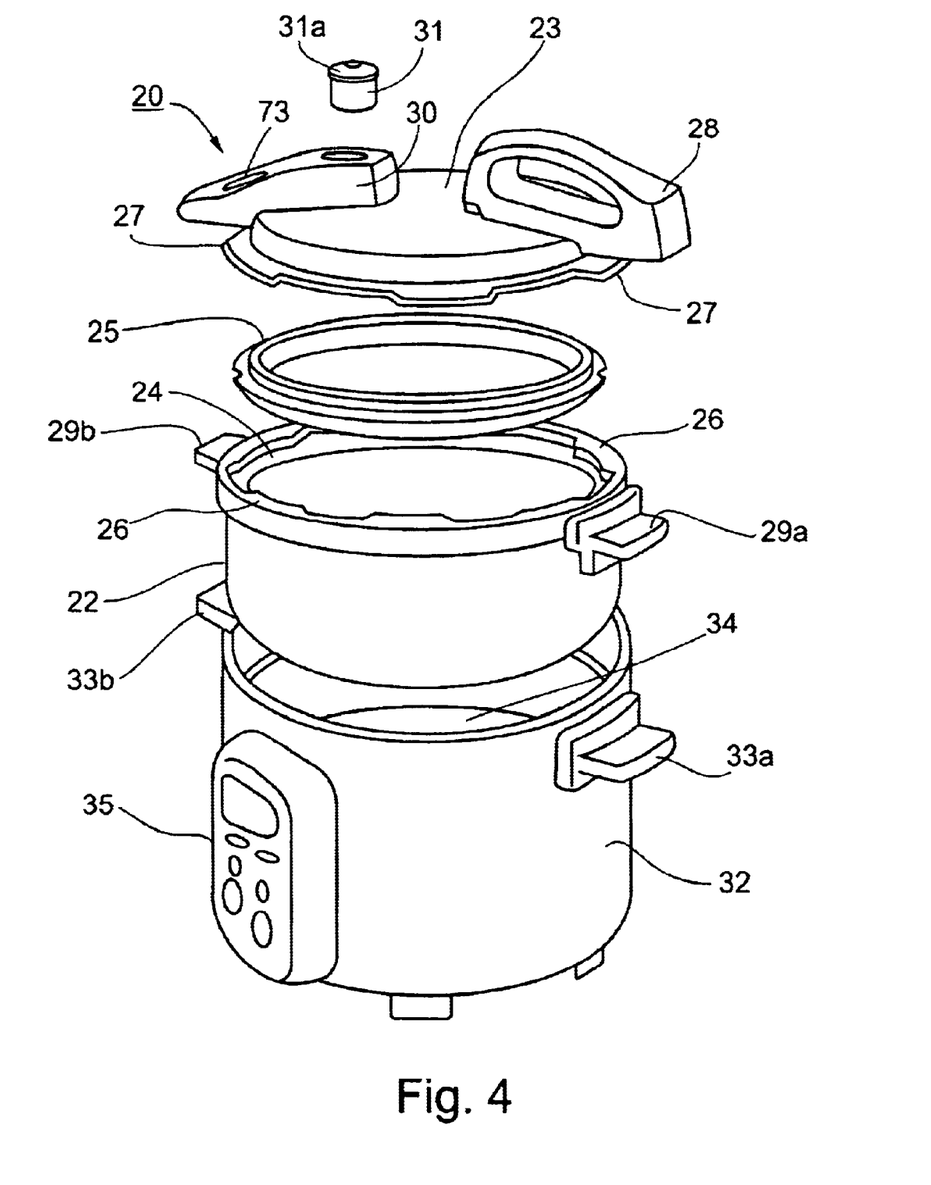
FIG. 4 is an exploded three-dimensional view illustrating another pressure cooker constructed in accordance with the present invention.
Figure 5:
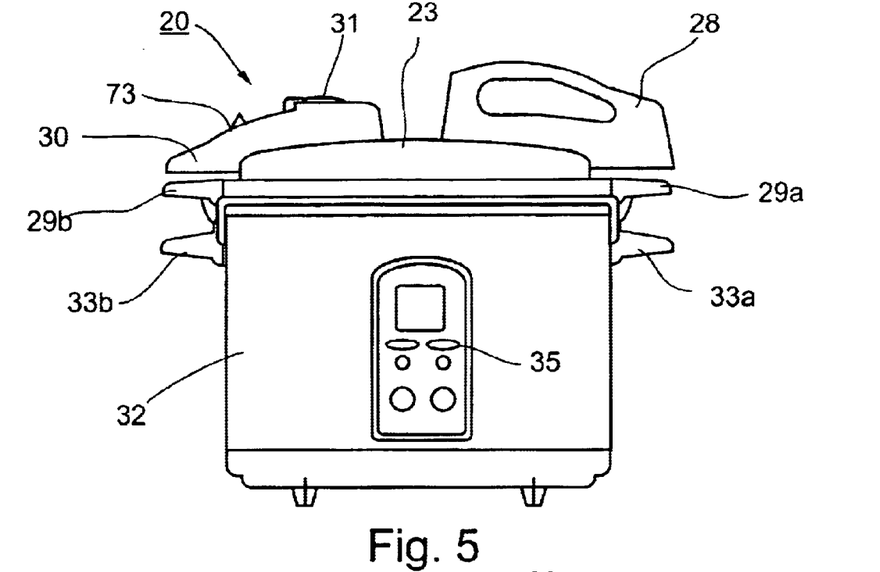
FIG. 5 is an assembly view of the pressure cooker illustrated in FIG. 4.

As shown particularly in FIG. 4, the pressure cooker illustrated therein, and generally designated 20, also includes a cooking pot 22 for receiving the food articles to be cooked, and a lid 23 removably attachable over the open end of the cooking pot and securely lockable thereto to enable cooking at high pressure and temperature. The open upper end of the cooking pot 22 is formed with an annular seat 24 for receiving an annular gasket 25 which assures a good seal between the cooking pot and the lid when the lid is securely attached to the cooking pot.

As in the pressure cooker illustrated in FIGS. 1–3, the open end of the cooking pot 22 is formed with a plurality of circumferentially-spaced inwardly-extending locking projections or flanges 26 fixed to the open end of the cooking pot and cooperable with outwardly-extending projections or flanges 27 formed around the outer periphery of the lid 3. In addition, a gripping handle 28 is fixed to the outer periphery of the lid 23; and a pair of gripping handles 29a, 29b are fixed to the cooking pot 22 at diametrically-opposite sides of its open end.

Also as in the pressure cooker of FIGS. 1–3, the lid handle 28 includes a locking mechanism cooperable with a shaped recess formed in the underlying cooking pot handle 29a for securely locking the lid 23 to the cooking pot 22. In the pressure cooker of FIGS. 4–22, however, the locking mechanism between handles 28 and 29a includes safety interlocks cooperating with a floating venting valve in the lid to better assure proper operation of the pressure cooker and to prevent accidental scalding of the user. The construction and operation of the floating valve within the lid are described below with respect to FIGS. 6, 7a and 7b; and the construction of the lid handle 8 including its safety interlocks with the floating valve in the lid is described below with respect to FIGS. 8–14.

As in the pressure cooker of FIGS. 1–3, the lid 23 in the pressure cooker of FIGS. 4–22 is also formed with a venting passageway normally closed by a weight which determines the magnitude of the pressure build-up permitted within the cooking pot 22, which weight may be manually lifted to produce a rapid release of the pressure within the cooking pot, e.g., to allow for detachment of the lid 3 without danger of scalding. In the pressure cooker 20 illustrated in FIGS. 4–22, however, the latter features are incorporated in an auxiliary handle 30 which accommodates the weight, shown at 31 in FIG. 4. Weight 31 controls the maximum pressure build-up within the cooking pot. It is manually liftable to produce a rapid release of the pressure within the cooking pot, and is also conveniently removable, by its finger piece 31a, to permit cleaning whenever desired. The construction of the foregoing elements within auxiliary handle 30 for performing these functions is more particularly described below with respect to FIGS. 15–21.

The illustrated pressure cooker further includes an outer housing 32, corresponding to housing 18 in FIG. 3, provided with a pair of handles 33a, 33b. The outer housing 32 includes an electrical heater, schematically shown at 34 in FIG. 4. It further includes a control panel 35 for presetting various control parameters in the pressure cooker and for displaying various conditions during its operation. The control panel 35 is described below with respect to FIG. 22.

Figure 6:
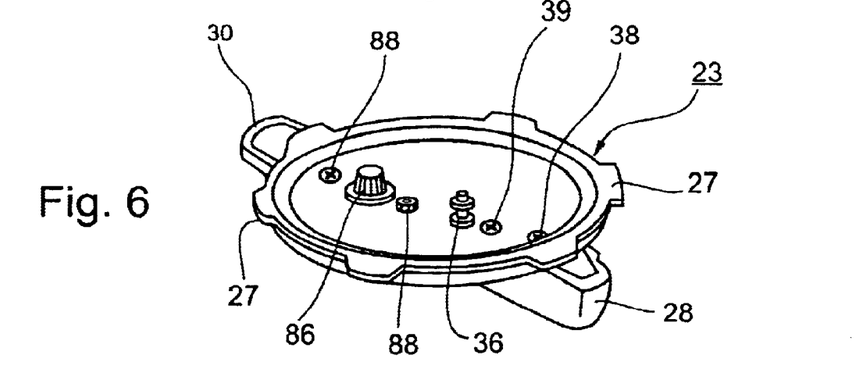
FIG. 6 is a perspective view of the underside of the lid in the pressure cooker of FIG. 4.
Figure 7A:
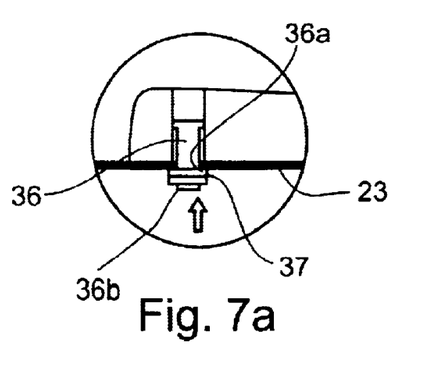
FIGS. 7a and 7b illustrate a venting valve included in the lid of FIG. 6, FIG. 7a illustrating the upper closed position of the venting valve, and FIG. 7b illustrating the lower open position of the venting valve.
Figure 7B:
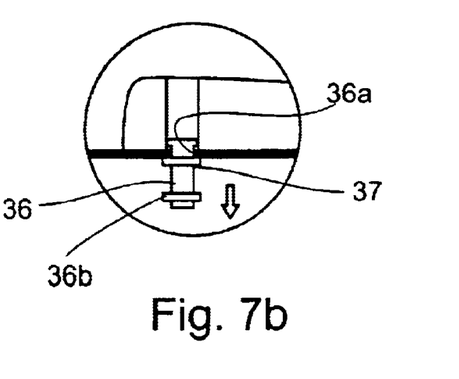

The Floating Valve Construction in the Lid (FIGS. 6, 7a, 7b)

The underside of lid 23 is illustrated in FIG. 6, wherein it will be seen that it includes a floating valve for venting the interior of the cooking pot to the atmosphere. The floating valve includes a venting member in the form of a floating pin 36 movable within an opening 36a through the lid 23. Floating pin 36 is formed at its lower end with an enlarged head 36b which carries a sealing washer 37 for opening and closing the venting opening 36a. Floating pin 36 normally assumes its lower position, shown in FIG 7b, wherein its sealing washer 37 opens the venting opening 36a venting the interior of the cooking pot to the atmosphere, but is movable by the pressure within the cooking pot to an upper position, shown in FIG. 7a, wherein its sealing washer 37 is pressed against the venting opening 36a to seal the interior of the cooking pot with respect to the atmosphere.

As described below with respect to FIGS. 8–14, the locking mechanism for locking the lid 23 to the cooking pot 22 includes a safety interlock preventing floating pin 36 from being moved to its upper position closing the vent opening 36a unless and until the lid 23 is securely locked to the cooking pot 22. This interlock thus prevents pressurizing the cooking pot whenever the lid is not securely locked to the cooking pot. This interlock also prevents the lid 23 from being rotated from its closed position towards its open position whenever the floating pin 36 is in its upper valve-closed position, thereby preventing opening the cooking pot when its interior may be under super-atmospheric pressure.

Gripping Handle 28 and its Safety Interlocks (FIGS. 8–14)

Figure 8:
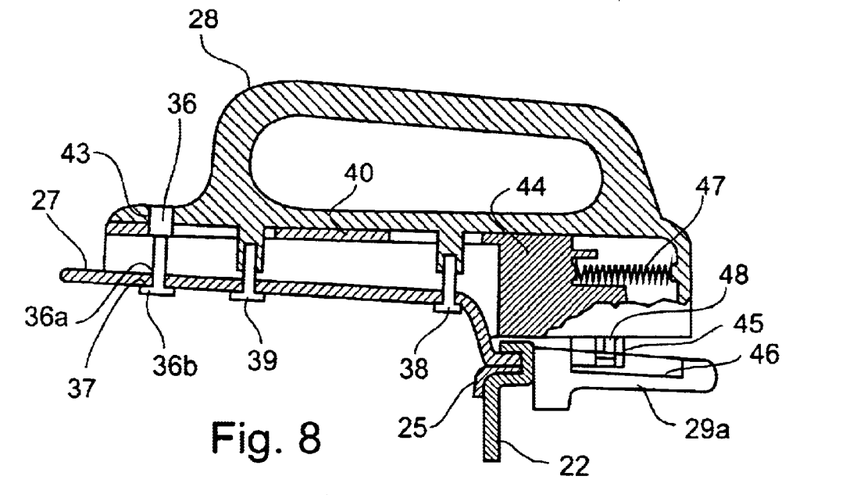
FIG. 8 is a fragmentary view, partly in section, illustrating the construction of the gripping handle in the lid and the underlying gripping handle in the cooking pot, and particularly showing a safety interlock incorporated therein to prevent misoperation of the pressure cooker.

As shown in FIG. 8, gripping handle 28 is fixed to the lid 23 by a pair of fastener pins 38, 39 passing through lid 23 and received within the underside of the handle. Gripping handle 28 is located to be in alignment with, and to overlie, floating pin 36 movable through venting opening 36a in the lid, described above with respect to FIGS. 6, 7a, 7b. The underside of handle 28 is formed with a cavity receiving a control slide 40. Control slide 40 is formed with a first elongated slot 41 for receiving fastener pin 38, and with a second elongated slot 42 for receiving fastener pin 39. As shown particularly in FIG. 8 the inner end of handle 28 is formed with an opening 43 alignable with venting opening 36a in the lid 23 through which the floating pin 36 is movable.

Figure 10:
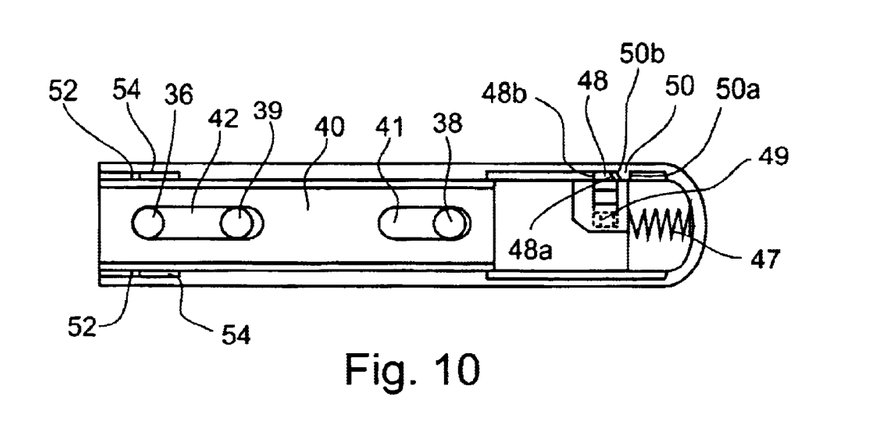
FIG. 10 is a bottom plan view of the lid gripping handle shown in FIG. 8 and particularly illustrating the control slide of the safety interlock therein.

As will be described more particularly below, control slide 40 carries with it the locking member (corresponding to locking member 10 in FIG. 1) which cooperates with cooking pot handle 29a to securely lock the lid to the cooking pot FIG. 10 illustrates the position of control slide 40 when its locking member securely locks the lid to the cooking pot, wherein it will be seen that the floating pin 36 is receivable within elongated slot 42. This allows pin 36 to rise into an opening 43 formed in the handle 28 to seal the venting opening 36a, and thereby permits the interior of the cooking pot to be pressurized.

Figure 12:
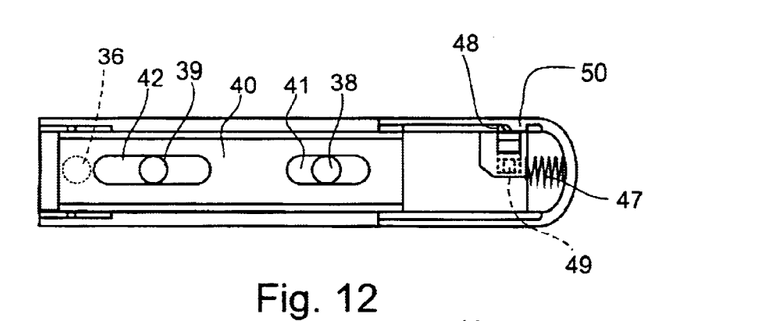
Figures 13, 14:
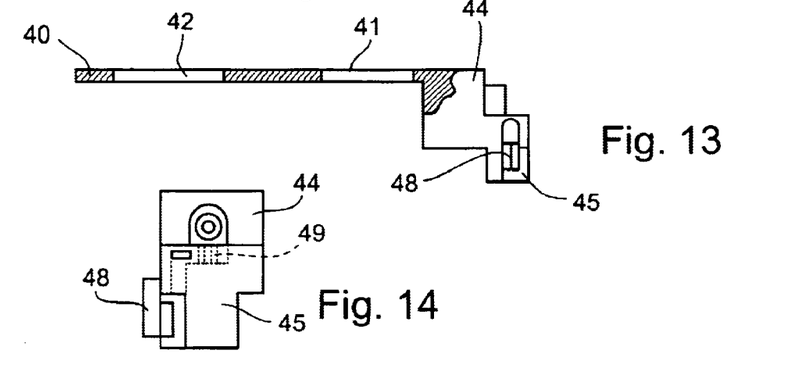
FIG. 13 is a side view, partly in section, illustrating the control slide shown in FIGS. 10 and 12 included in the lid gripping handle.
FIG. 14 is a front elevational view illustrating the control slide of FIG. 13.

FIG. 12, on the other hand, illustrates the position of control slide 40 when its locking member does not securely lock the lid to the cooking pot. It will be seen that in this case the end of the slide overlies the floating pin 36, and prevents it from rising to its vent-closing position into opening 43 of the handle, thereby preventing the pressurization of the interior of the cooking pot.

Figure 11:
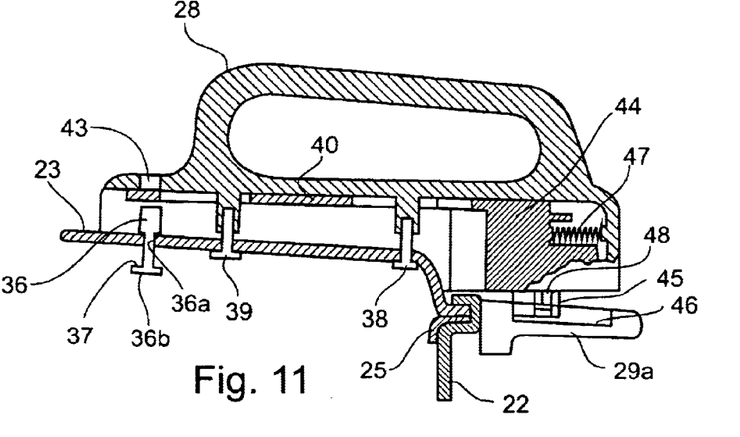
FIGS. 11 and 12 are views corresponding to FIGS. 8 and 10, respectively, but illustrating the position of the control slide in the lid gripping handle preventing pressurization of the cooking pot when the lid is not securely locked onto the cooking pot.

As shown in FIGS. 8 and 11, the outer part of control slide 40 is integrally formed as an enlarged head 44 having a depending projection 45 receivable within a shaped recess 46 formed in the upper surface of the cooking pot handle 29a underlying the lid handle 28. Control slide 40 is urged inwardly by a spring 47 interposed between enlarged head 44 and the handle end wall. The depending projection 45 is formed with a cutout receiving a locking element 48 which is urged outwardly by spring 49 into alignment with an abutment 50 fixed to the undersurface of handle 28.

As shown particularly in FIGS. 10 and 12, the fixed abutment 50 is formed with an outwardly-facing perpendicular surface 50a, and with an inwardly-facing inclined surface 50b. The locking element 48, on the other hand, is formed with an outwardly-facing inclined surface 48a and with an inwardly-facing perpendicular surface 48b. As will be described more particularly below, perpendicular surface 48b of the locking member 48 cooperates with the perpendicular surface 50a of the abutment to retain the locking member 48 outwardly in the shaped recess 46, whereas the inclined surface 48 of the locking member cooperates with the inclined surface 50b of the abutment to release the locking member for inward movement within the shaped recess.

Figure 9:
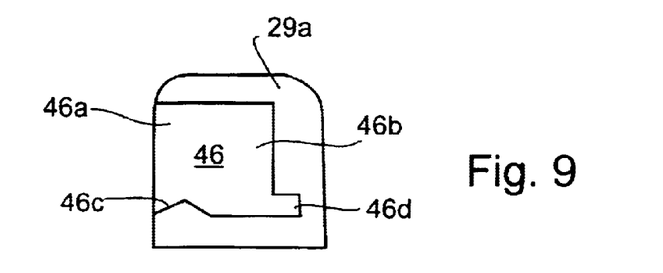
FIG. 9 is a top plan view illustrating the locking recess in the cooking pot handle shown in FIG. 8.

The shaped recess 46 in the cooking pot handle 29a receives the locking element 48 and the depending projection 45 carried by the control slide 40. The shape of recess 46 is more particularly illustrated in FIG. 9. It includes an open section 46a at one side for receiving locking element 48, a closed section 46b at the opposite side, a V-shaped cam surface 46c between the two sections 46a, 46b, and a locking section 46d at the end of the closed section 46b.

The movements of control slide 40 to and between its inner position (FIGS. 8 and 10) and its outer position (FIGS. 11 and 12) are guided by the two fastener pins 38, 39 received within slots 41 and 42, and also by two pins 51, 52 projecting from the upper face of the control slide at the opposite sides of its inner end, and received within guiding slots 53, 54 formed in handle 28.

Lid Auxiliary Handle 30 and its Pressure Control

The lid auxiliary handle 30, and the parts associated therewith including weight 31 for controlling the pressure within the cooking pot 22, are more particularly illustrated in FIGS. 15–21.

Figure 15:
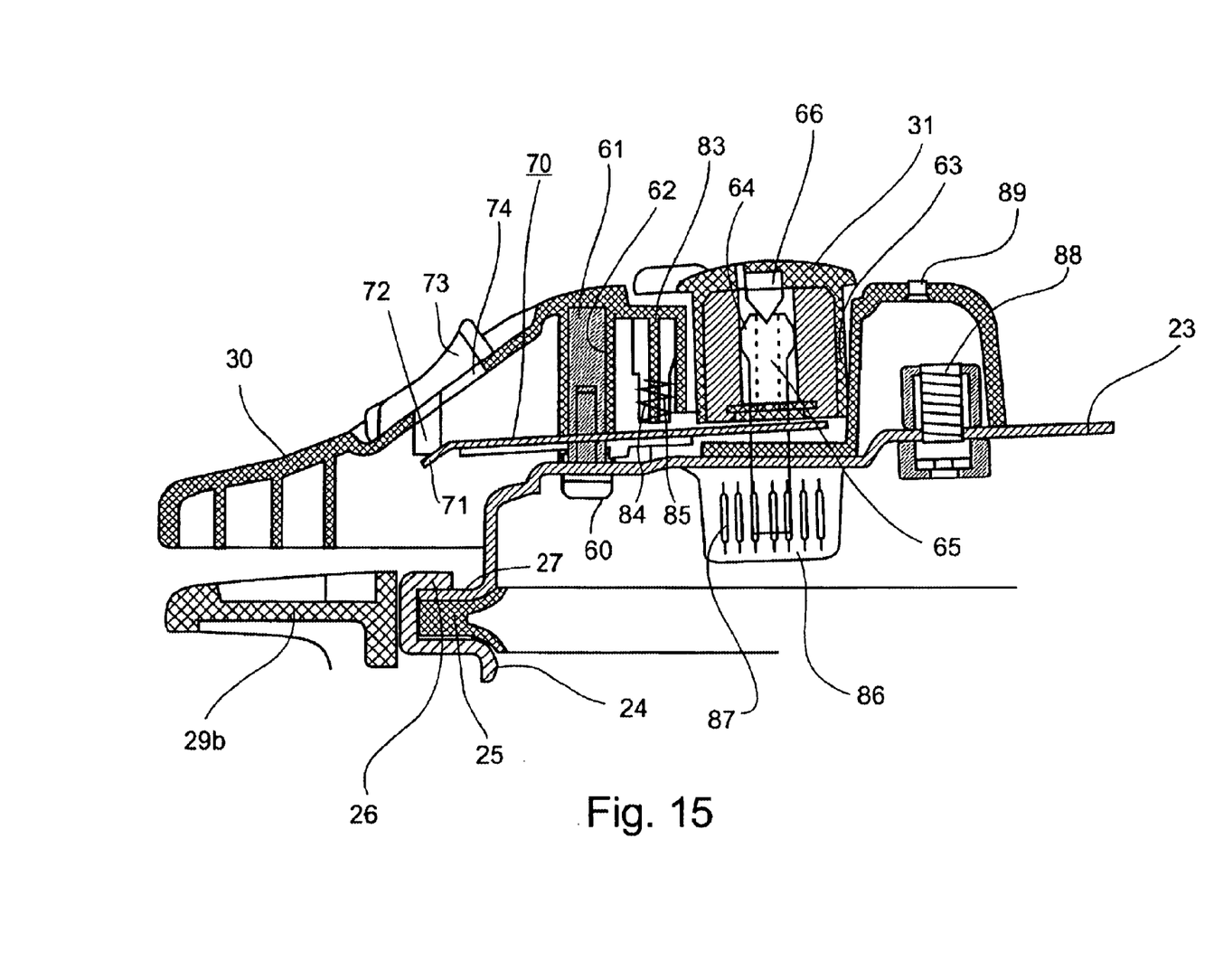
FIG. 15 is a sectional view illustrating the auxiliary handle attached to the lid and the underlying gripping handle attached to the cooking pot of the pressure cooker of FIG. 4, and particularly showing the structure for manually releasing the high-pressure steam to the atmosphere before opening the lid.
Figure 16:
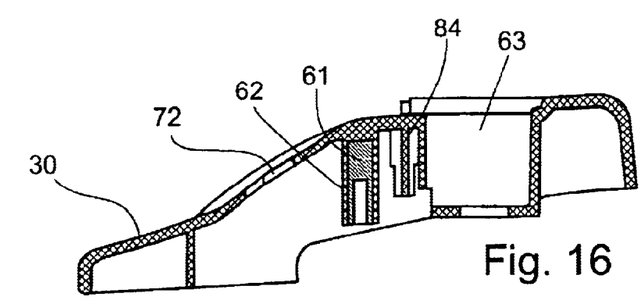
FIG. 16 is a sectional view more particularly illustrating the construction of the auxiliary handle illustrated in FIG. 15.

Thus, as shown in FIG. 15, auxiliary handle 30 is fixed to the lid 23 by fastener 60 passing through the lid and threaded into a plastic insert 61 fixed within a tubular cavity 62 in the underside of the auxiliary handle. The inner end of the auxiliary handle 30 is formed with another tubular cavity 63 for receiving the weight 31 which controls the pressure within the cooking pot. For this purpose, lid 23 is pierced by a vertical stem 64 formed with an axial passageway 65 therethrough for venting the interior of the cooking pot to the atmosphere. The top wall of weight 31 is provided with a depending valve member 66 which normally blocks the venting passageway 65 but which rises, upon the presence of an excess pressure within the cooking pot, to open the venting passageway to the atmosphere and thereby to release the excess pressure through openings 67 in the top wall of the weight 31.

It will thus be seen that weight 31 determines the maximum pressure permitted within the cooking pot. Whenever the pressure within the cooking pot exceeds the maximum permitted by the weight, the weight will rise to open venting passageway 65 to the atmosphere, thereby releasing the excess pressure, and will then automatically drop back into place to close the venting passageway.

The auxiliary handle 30 also includes means for manually releasing the pressure within the cooking pot, which is necessary before removing the lid 23 to avoid the danger of scalding.

Figure 17:
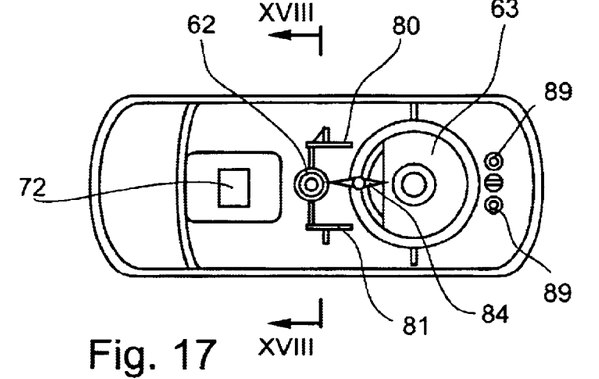
FIG. 17 is a bottom plan view of the auxiliary handle illustrated in FIG. 16.

For this purpose, a control lever 70 is pivotally mounted within the auxiliary handle 30. The outer end of lever 70 is slanted downwardly, as shown at 71 in FIG. 15, and is engageable by a stem 72 depending from a pushbutton 73 slidable within a slot 74 in the auxiliary handle 30. The inner end of lever 70 is bifurcated as shown at 75 (FIG. 20), and is received within cavity 63 to underlie the weight 31. Lever 70 is pivotally mounted to the auxiliary handle 30 by a pair of projections 76, 77 (FIG. 20) formed in perpendicular side walls 78, 79 along the opposite sides of the lever 70. These projections are received within openings formed in depending ribs 80, 81 (FIG. 17) formed in the under surface of the auxiliary handle.

Figure 20:
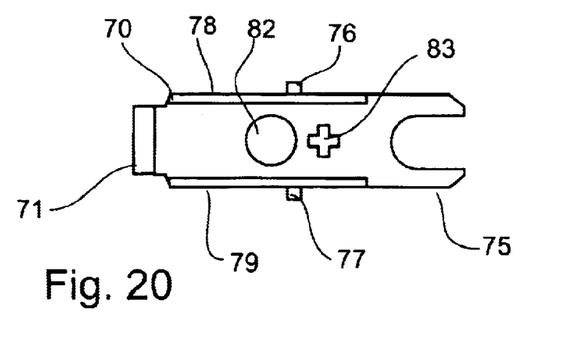
Figure 21:
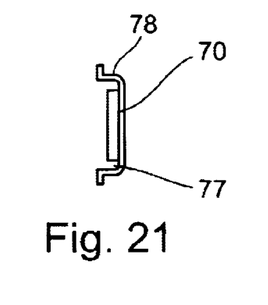

As further shown in FIG. 20, control lever 70 is formed with a circular opening 82 for accommodating the tubular cavity 62 for insert 61 receiving the fastener 60 attaching the auxiliary handle 30 to the lid 23. Control lever 70 is also formed with a crossed opening 83 for receiving the end of a crossed-rib formation 84 (FIG. 15). Rib formation 84 which in turn receives a spring 85 normally urging the bifurcated end 75 of the control lever 70 to its lower position, as illustrated in FIG. 15.

As will be described more particularly below, the parts within the auxiliary handle 30 are normally positioned as illustrated in FIG. 15, with pushbutton 73 in its lower position, and with control lever 70 urged downwardly by spring 84 such that the bifurcated end 75 (FIG. 20) of the control lever is also in its lower position under weight 31. In this condition, the weight is effective to permit a high pressure, and to regulate the pressure, within the cooking pot as described above. When the high pressure within the cooking pot is to be released, pushbutton 72 is moved upwardly, thereby pivoting lever 70 counter-clockwise about its pivots 76, 77, to cause the bifurcated end 75 of the lever to raise the weight 31, and thereby to release the pressure within the cooking pot to the atmosphere via the venting passageway 65.

Figure 18:
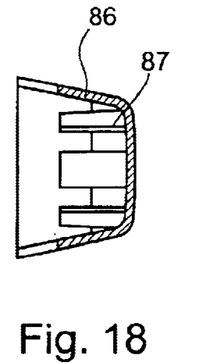
FIG. 18 is a sectional view along line XVIII—XVIII in FIG. 17.
Figure 19:
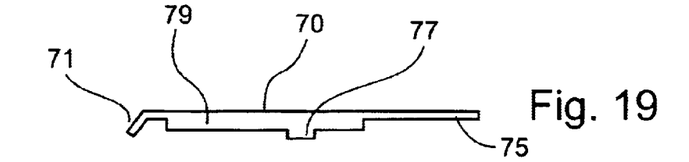
FIGS. 19, 20 and 21 are side-elevational, top-plan and end-elevational views, respectively, illustrating the construction of a control lever included in the auxiliary handle of FIG. 15 for producing the quick release of the pressure.

As shown particularly in FIGS. 15 and 18, the underside of the lid 23 is provided with a hood 86 underlying the venting passageway 65 through stem 64. Hood 86 is formed with an annular array of slots which serve as restrictive passageways 87 to restrict the discharge of the steam through the venting passageway 65 when weight 31 is lifted by pushbutton 73, or by the steam pressure under the lid, as described above.

The lid 23 is further provided with a temperature-operated safety valve 88 (FIG. 15) which automatically opens to vent steam to the atmosphere through passageway 89 should the temperature within the cooking pot become excessively high.

Figure 22:
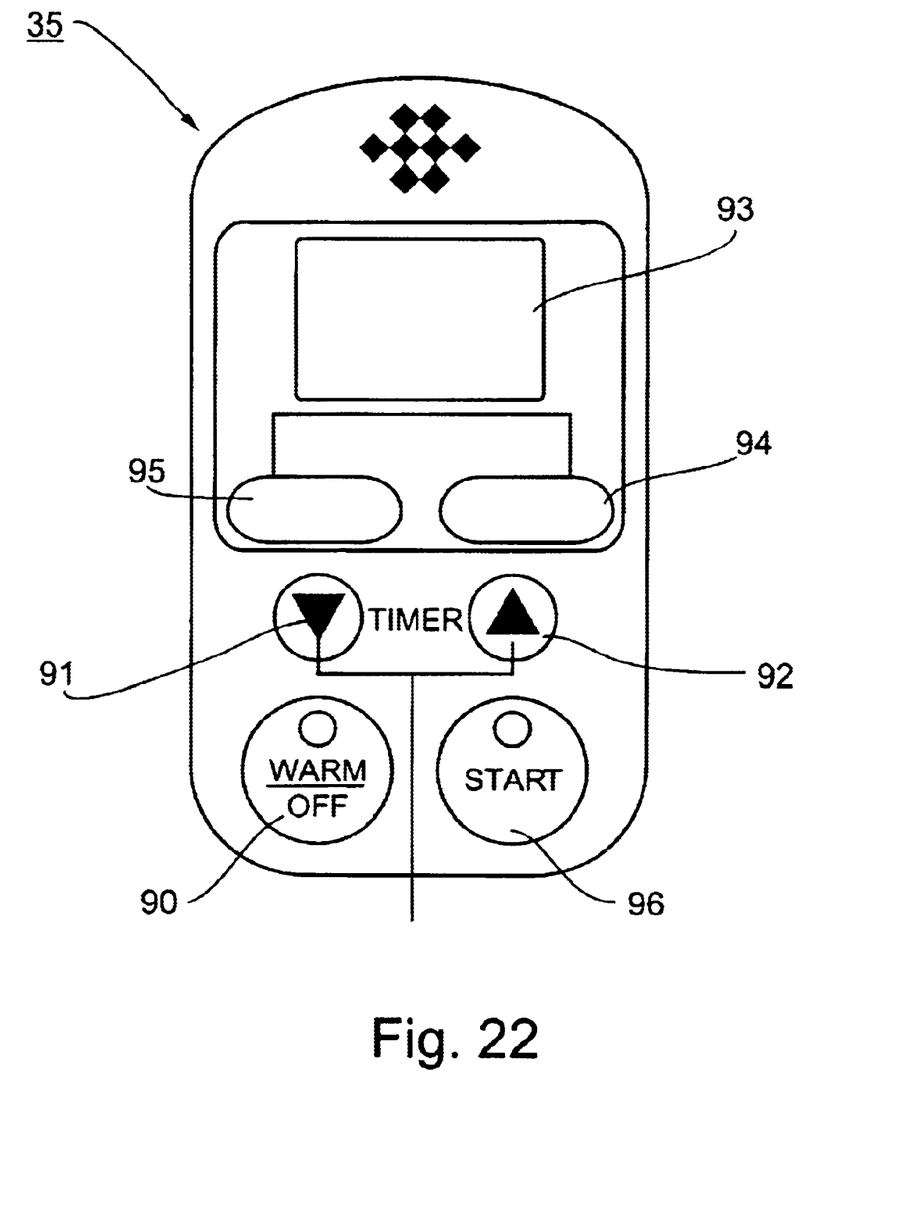
FIG. 22 illustrates the control panel in the pressure cooker of FIGS. 4 and 5.

Control Panel 35 (FIG. 22)

The illustrated pressure cooker is programmable according to the desired pressure, cooking mode, and cooking time. For this purpose, the control panel 35 illustrated in FIG. 22 includes an On/Off button 90 which when first depressed, turns the cooker On to produce a warm mode of operation, and when next depressed, turns the pressure Off. The control panel 35 further includes a Down-Time button 91 and an Up-Time button 92 which may be depressed to select the desired cooking time as displayed in a display window 93. The control panel further includes a Cooking Mode button 94 for selecting the cooking mode (e.g., high, low, medium), and a Pressure Mode button 95 which selects the pressure (super-atmospheric, atmospheric), both displayed in the display window 93. If a super-atmospheric pressure is selected, pushbutton 73 (FIG. 15) would be in its lower position, thereby making weight 31 effective to control the venting passageway 65, to produce a regulated super-atmospheric pressure; whereas if an atmospheric pressure is selected, pushbutton 73 would be moved to its upper position thereby lifting weight 31 to open the venting passageway 65 to the atmosphere.

Control panel 35 further includes a Start button 96 which is depressed to start the pressure cooker.

Operation

The operation of the pressure cooker 20 illustrated in FIGS. 4–22 is as follows:

The user first programs the pressure cooker according to the particular cooking operation desired by presetting the parameters into the control panel 35 as described above.

After the pressure cooker has been programmed, the sealing gasket 25 is applied on the annular seat 24 of the cooking pot 22, and the lid 23 is then applied to the cooking pot, if this had not been previously done. The lid is applied to the cooking pot by aligning the circumferentially-spaced flanges 27 of the lid 23 between the circumferentially-spaced flanges 26 of the cooking pot 22, pressurizing the lid inwardly to compress the sealing gasket 25, and then rotating the lid by grasping handle 28 with one hand, and either handle 29a or 29b with the other hand, to bring the locking element 48 of the control slide 40 in the handle 28 into the open section 46a (FIG. 9) of the shaped recess 46 formed in the upper surface of handle 29a The lid is further rotated to move locking element 48 along cam surface 46c of the shaped recess 46, through section 46b and into the locking section 46d of that recess.

Before the lid 23 is so rotated, the floating pin 36 must be in its down position in the lid, as shown in FIG. 7b, to permit the slide 40 to pass over it to the position illustrated in FIG. 11. This feature acts as a safety interlock since it enables rotation of the lid to its locking position only when the cooking pot is not pressurized.

When the lid is in its locking position, with locking element 48 seated within the locking section 46d of the shaped recess 46, the control slide 40 is in its inner position, as shown in FIG. 8, with the floating pin 36 aligned with, but located below, the venting opening 43 formed in the handle 28.

As the cooking operation proceeds, a super-atmospheric pressure is built-up within the cooking pot 22. This causes the floating pin 36 to rise. If the lid 23 is not securely locked to the cooking pot 22, with the locking element 48 received within the locking section 46d of the shaped recess 46, the inner end of slide 40 will overlie the upper end of the venting pin 36, as shown in FIG. 11, thereby blocking the venting pin from rising sufficiently to make its sealing washer 37 effective to seal the venting opening 36a through the lid 3. This would vent the interior of the cooking pot to the atmosphere, and thereby prevent a super-atmospheric pressure from being built-up within the cooking pot. Accordingly, this feature provides another safety interlock in that it assures that the lid is in its securely-closed position before the cooking pot can be pressurized above atmospheric pressure.

The foregoing arrangement also acts as a safety interlock to assure that the lid, when in its securely closed position, cannot be rotated to its open position so long as a super-atmospheric pressure exists within the cooking pot 22. Thus, when such a super-atmospheric pressure exists, the floating pin 36 rises into the elongated slot 42 of slide 40, thereby preventing the slide from moving outwardly to clear the cam surface 46c of the shaped recess 46 in handle 29a, which is necessary in order to detach the lid 23 from the cooking pot 22.

During the cooking operation, the weight 31 covering the venting passageway 65 in stem 64 permits the pressure within the cooking pot to be built-up to a predetermined super-atmospheric pressure, as determined by the weight of the weight 31. Thus, when the predetermined super-atmospheric pressure is exceeded, this will cause weight 31 to rise sufficiently to permit release only of the excess pressure via venting passageway 65, and thereby to maintain the predetermined regulated pressure.

After the cooking operation has been completed, or at any other time, the high-pressure within the cooking pot may be manually released by moving pushbutton 73 inwardly in the auxiliary handle 30 to its upper position. Thus, in the normal lower (or outer) position of pushbutton 73, lever 70 is in the position illustrated in FIG. 15, with its bifurcated end 75 underlying the weight 31 thereby enabling the weight to regulate the high pressure within the cooking pot; and when the pushbutton is moved inwardly, it causes the control lever 70 to pivot counter-clockwise, whereby the bifurcated end 75 of the lever lifts weight 31 off of the venting passageway 65, to permit a rapid release of the pressure within the cooking pot.

When the pressure within the cooking pot is thus released, floating pin 36 returns by gravity to its lower position to underlie the slide 40, and thereby to permit the handle 28 to be rotated in order to detach the lid 23 from the cooking pot 22.

While the invention has been described with respect to two preferred embodiments, it will be appreciated that these are set forth merely for purposes of example, and that many other variations, modifications and applications of the invention may be made.

What is claimed is:

1. A pressure cooker, comprising:

a cooking pot having an open end through which food articles are introduced for cooking, and removed after cooking;

and a lid removably attachable over the open end of said cooking pot and securely lockable thereto to enable cooking at high pressure;

said cooking pot being formed with a plurality of circumferentially-spaced locking flanges fixed to, and extending radially inwardly around the open end of the cooking pot;

said lid being formed with a plurality of circumferentially-spaced locking flanges extending radially outwardly around its outer periphery located to enable the lid:

(a) to be applied over the open end of the cooking pot by passing the lid flanges through the spaces between the cooking pot flanges; and (b) to be manually rotated to either a locking position wherein the lid flanges underlie the cooking pot flanges to securely lock the lid to the cooking pot, or to an unlocking position wherein the lid flanges are in the spaces between the cooking pot flanges to enable detachment of the lid from the cooking pot.

2. The pressure cooker according to claim 1, wherein:
said open end of the cooking pot is formed with an annular seat underlying said cooking pot flanges;
and an annular gasket is seated on said annular seat for sealing the space between said cooking pot and lid when the lid is applied and securely locked to the cooking pot.

3. The pressure cooker according to claim 1, wherein said cooking pot includes a pair of gripping handles fixed at opposite sides of its open end.

4. The pressure cooker according to claim 1, wherein:
said lid further includes a gripping handle fixed thereto along its outer periphery;
and said cooking pot further includes at least one gripping handle fixed thereto at its open end and located to underlie said lid handle, and to be locked thereto, in the locking position of the lid.

5. The pressure cooker according to claim 4, wherein:
a venting valve movable to an open position to vent the interior of the cooking pot to the atmosphere, or to a closed position to permit the pressure in the cooking pot to rise to a super-atmospheric pressure;
and a safety interlock within said gripping handle of the lid permitting rotation of the lid from one of its positions to its other position only when said valve is in its open position, and permitting movement of the valve from its open position to its closed position only when the lid is in its locking position with respect to the cooking pot.

6. The pressure cooker according to claim 5, wherein:
said venting valve includes a floating pin movable vertically within a venting opening in said lid;
said floating pin is movable by gravity to a lower position opening said venting opening, and by steam pressure to an upper position closing said venting opening;
said safety interlock includes a control member blocking the movement of said floating pin to its upper closed position except when said locking element is in its locking position, to prevent pressurizing the interior of the cooking pot; and
said floating pin, when in its upper closed position, blocks the movement of the control member to the unlocking position of the locking element, to prevent opening the lid when the cooking pot is under pressure.

7. The pressure cooker according to claim 6, wherein said control member is a slide coupled at one end to said locking element and formed at its opposite end with an opening located to receive said floating pin only when the locking element is in its locking position.

8. The pressure cooker according to claim 4, wherein:
said lid further includes an auxiliary handle diametrically opposite to said gripping handle in the lid to facilitate rotating said lid with respect to said cooking pot.

9. The pressure cooker according to claim 8, wherein said auxiliary handle of the lid includes:
a pressure release valve having a venting passageway through the lid normally closed by a weight to permit pressurizing the interior of the cooking pot;
and a release member manually movable to lift said weight and thereby to permit rapid release of the pressure within the interior of the cooking pot.

10. The pressure cooker according to claim 9, wherein said release member includes:
a pushbutton manually movable by the user to a closed position or to a rapid-release position;
and a pivotal lever having one end movable by said pushbutton, and an opposite end engageable with said weight to lift the weight to its open position with respect to said venting passageway upon movement of the pushbutton to its rapid-release position.

11. The pressure cooker according to claim 10, wherein:
said venting passageway through the lid is in a vertical stem having an axial passageway therethrough and located centrally of a cavity formed in the lid;
and said weight is removably received in said cavity normally engaging the upper end of the stem passageway to close same, said weight being liftable by excessive pressure within the cooking pot, and by said pivotal lever when pivotted by said slide button, to produce a rapid-release of the pressure within the cooking pot.

12. A pressure cooker, comprising:
a cooking pot having an open end through which food articles are introduced for cooking, and removed after cooking;
and a lid removably attachable over the open end of said cooking pot and securely lockable thereto to enable cooking at high pressure;
said lid including a gripping handle fixed thereto along its outer periphery;
said cooking pot including at least one gripping handle fixed thereto at its open end and located to underlie said lid handle, and to be locked thereto, in the locking position of the lid;
said lid further including:
a venting valve movable to an open position to vent the interior of the cooking pot to the atmosphere, or to a closed position to permit the pressure in the cooking pot to rise to a super-atmospheric pressure;
and a safety interlock within said gripping handle of the lid permitting rotation of the lid from one of its positions to its other position only when said valve is in its open position, and permitting movement of the valve from its open position to its closed position only when the lid is in its locking position with respect to the cooking pot;
said lid being fixed to its gripping handle by a pair of fastener pins;
said safety interlock including a control member movable from a first position when the two gripping handles are aligned, to a second position when the two gripping handles are not aligned;
said control member being formed with a pair of elongated slots receiving said fastener pins and guiding the movement of said control member.

13. The pressure cooker according to claim 12, wherein:
said venting valve includes a floating pin movable vertically within a venting opening in said lid;
said floating pin is movable by gravity to a lower position opening said venting opening, and by steam pressure to an upper position closing said venting opening;
said control member blocks the movement of said floating pin to its upper closed position except when said locking element is in its locking position, to prevent pressurizing the interior of the cooking pot; and
said floating pin, when in its upper closed position, blocks the movement of the control member to the unlocking position of the locking element, to prevent opening the lid when the cooking pot is under pressure.

14. The pressure cooker according to claim 13, wherein said control member is a slide coupled at one end to said locking element and formed at its opposite end with an opening located to receive said floating pin only when the locking element is in its locking position.

15. The pressure cooker according to claim 14, wherein said locking element of the slide is movable within a shaped recess in said underlying gripping handle of the cooking pot to said locking position or to said unlocking position with respect to said cooking pot.

16. A pressure cooker, comprising:

a cooking pot having an open end through which food articles are introduced for cooking, and removed after cooking;

and a lid rotatably mounted over the open end of said cooking pot and securely lockable thereto to enable cooking at high pressure;

said lid including a gripping handle fixed to the lid at one side of its outer periphery, and an auxiliary handle fixed to the lid at the opposite side of its outer periphery;

said cooking pot including two gripping handles fixed to opposite sides of the open end of the cooking pot, such as to enable a user to grasp by two hands one handle of the lid and one handle of the cooking pot and to rotate the lid with respect to the cooking pot to the locking and unlocking positions of the lid.

17. The pressure cooker according to claim 16, wherein said lid auxiliary handle includes:

a pressure release valve having a venting passageway therethrough normally closed by a weight to permit pressurizing the interior of the cooking pot;

and a release member manually movable to lift said weight and thereby to permit rapid release of the pressure within the interior of the cooking pot.

18. The pressure cooker according to claim 17, wherein said release member includes:

a pushbutton manually movable by the user to a closed position or to a rapid-release position;

and a pivotal lever having one end movable by said pushbutton, and an opposite end engageable with said weight to lift the weight to its open position with respect to said venting passageway upon movement of the pushbutton to its rapid-release position.

19. The pressure cooker according to claim 17, wherein:

said venting passageway through the lid is in the form of a vertical stem having an axial passageway therethrough and located centrally of a cavity formed in said auxiliary handle of the lid;

and said weight is located in said cavity and normally engages the upper end of the stem passageway to close same, but is liftable by excessive pressure within the cooking pot, and by said pivotal lever when pivotted by said pushbutton, to produce a rapid-release of the pressure within the cooking pot.

20. The pressure cooker according to claim 1, wherein the pressure cooker further comprises an outer housing for receiving a heating liquid, and has an open end for receiving said cooking pot to be heated by the heating liquid within said outer housing.

* * * * *